B. J. MULLENUX.
HOSE COUPLING.
APPLICATION FILED SEPT. 25, 1920.
1,384,332.
Patented July 12, 1921.
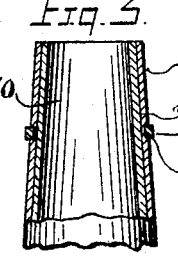
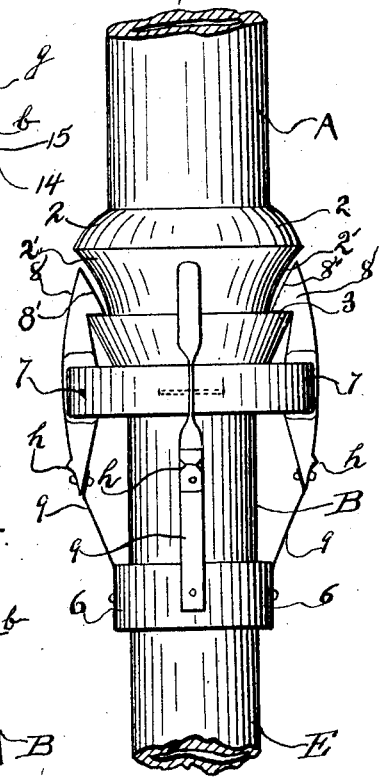
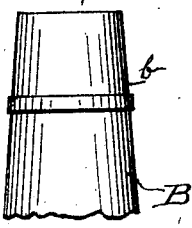
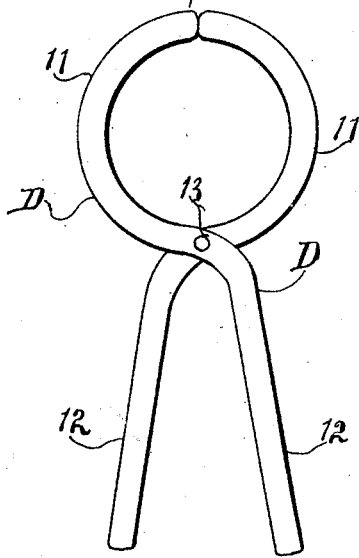
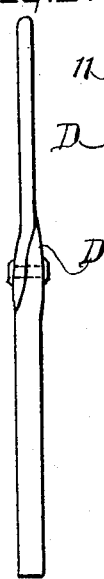
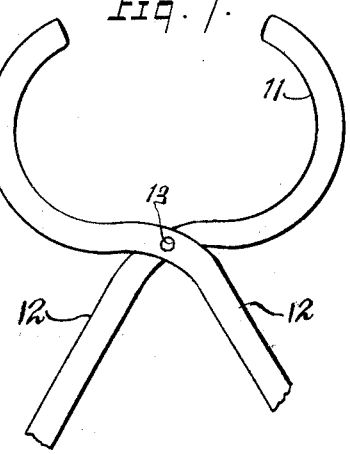
INVENTOR
Brisco J. Mullenux
BY
F. N. Gilbert
ATTORNEY

UNITED STATES PATENT OFFICE.

BRISCO J. MULLENUX, OF AFTON, NEW YORK.

HOSE-COUPLING.

1,384,332.  Specification of Letters Patent.  Patented July 12, 1921.

Application filed September 25, 1920. Serial No. 412,875.

*To all whom it may concern:*

Be it known that I, BRISCO J. MULLENUX, a citizen of the United States, residing at Afton, in the county of Chenango and State of New York, have invented certain new and useful Improvements in Hose-Couplings, of which the following is a specification.

My invention pertains to hose couplings and it has for its object to provide a hose coupling, members of which are adapted to be connected by a simple rectilineal movement of one or both of these through the medium of a simple, strong connecting mechanism, which is not exposed to the weather, passing through the coupling, and is therefore, not liable to be set by freezing or deteriorated by corrosion, and which permits ready uncoupling of the members, also providing a quick connecting hose, or connecting hose to the faucet, and to dispense with threads and providing a connection, that will be universal. With these objects in view my invention consists of certain novel features of construction and arrangement of parts as will be hereinafter more fully described and pointed out in the claims, reference being had to the accompanying drawings, in which—

Figure 1, is a perspective view of a part of my device, partly in cross section.

Fig. 2, is a perspective view of my device.

Fig. 3, is a cross sectional view of a fragmentary part of my device.

Fig. 4, is a perspective view of a fragmentary part of my device.

Fig. 5, is a plan view of a gripping tool employed in detaching the coupling.

Fig. 6, is an edge view of same tool.

Fig. 7, is a plan view of the same tool.

The same reference characters denote like parts in each of the several figures of the drawings. In carrying out my invention, I provide the two members male and female members of the coupling, the female member A and the male member B. The member A in annular formation has an annular reinforcing ring 2 and also the same being in-cut on its lower side, producing the annular shoulder 3 around the member A. It has also the inner chamber 4 adapted to receive the tapered end of the opposite member B. The annular shoulder 3 is also under cut in order to provide a grip for the pivoted pawl levers 8, 8, 8, hereinafter mentioned. The opposite male member B in annular formation is surrounded at its base with the annular ring projection 6, and an interior chamber in which the hose body E may be attached in any convenient manner. The annular neck projection B is surrounded by the annular ring 7 in which is pivoted the pawl levers 8, 8, 8, etc., having mounted upon their base, the band spring connections 9, 9, 9, which in turn are mounted in any convenient manner upon neck B and are adapted to hold the pawl levers 8, 8, 8, etc., in engagement with the annular shoulder 3 of member A above. The member B has a slightly tapered annular head projection $b$ adapted to meet and enter chamber 4 of member A. The shoulder 7 forms a seat for the annular ring 3 of member A. Vertically through the member B I have the usual tubular opening 10. The head projection $b$ may be surrounded by any resilient cover $g$ to permit a closer union of the member B with chamber 4 in member A. For the purposes of engaging and disengaging the pawl levers 8, 8, 8, etc., mounted on member B from engagement with member A I have the grip tool D formed with the pivoted circular jaws 11, 11, and handles 12, 12 pivoted at 13 and adapted to encircle the pawl levers 8, 8, 8, etc., at any convenient point for actuating engagement or disengaging the same. The base of member A is engaged in any convenient manner with the hose section E. The spring supports 9, 9, 9, are adapted to hold the pawl levers of 8, 8, 8, etc., in a horizontal position on a line with the outer surface of the member B and in the operation of uniting members A and B the slanting surface 2' of the annular in-cut shoulder 2 contacts with the sloping surface 8' of levers 8, 8, 8, etc., and crowd them open while the members A and B are united together, whereupon the pawl levers 8, 8 moved by springs 9, 9, 9 automatically hook over upon the shoulder projection 3 and thus hold members A and B connected together. On the base of levers 8, 8, I have the projecting lugs $h, h$. To uncouple the members I apply the tool D opening the jaws by gripping the base of the levers 8, 8, 8, etc., above the lugs $h, h$, and thus free them from engagement with shoulder 3 and permit the releasing of member A from member B. Thus the uncoupling is completed. The lugs $h\ h$ prevent the slipping downward of the jaws 11, 11, when grasping levers 8, 8, 8. To further secure a close union between the members A and B I elect and have channel 14 in the outer covering g or in the outer surface of b, in which channel or depression I may place a ring 15 of rubber or other resilient material. This compressed ring material, thus mounted, insures a close joint or union between the members.

Having thus described my invention what I claim as new and for which I desire Letters Patent is as follows:

In a hose coupling, the combination of a tube having an undercut annular shoulder thereon, and a tapered socket in one end thereof with a tube having a tapered end, and a resilient cover thereon, adapted to engage with the tapered socket of the opposite tube end, a channel inlet in said covering, a resilient ring mounted therein, a collar on said tube, pawl levers pivotally mounted in said collar, adapted to yieldingly engage said shoulder, a band spring supporting each lever in engagement with the shoulder, a lug projecting from the lower outer surface of each lever.

In testimony whereof I have affixed my signature.

BRISCO J. MULLENUX.